United States Patent [19]

Shaw

[11] Patent Number: 5,308,026
[45] Date of Patent: May 3, 1994

[54] MIDLINE CABLE CLAMP CONSTRUCTION
[75] Inventor: Charles R. Shaw, Twinsburg, Ohio
[73] Assignee: Esmet, Inc., Canton, Ohio
[21] Appl. No.: 848,340
[22] Filed: Mar. 9, 1992
[51] Int. Cl.$^5$ .............................................. E21F 17/02
[52] U.S. Cl. .................... 248/63; 24/115 M; 24/135 R; 24/136 R
[58] Field of Search ............... 248/65, 63, 74.4, 74.5; 24/136 R, 115 M, 135 R; 403/339, 369, 340, 344, 370, 371, 381

[56] References Cited

U.S. PATENT DOCUMENTS

| 1,647,398 | 11/1927 | Draheim et al. | 24/115 M |
| 1,653,840 | 12/1927 | Byl | 24/115 M |
| 1,819,983 | 8/1931 | Voituron | 24/135 R |
| 2,264,381 | 12/1941 | Hummel | 24/136 R |
| 3,716,650 | 2/1973 | de Mecquenem | 24/135 R |
| 4,407,471 | 10/1983 | Wilmsmann et al. | 248/63 |
| 4,509,233 | 4/1985 | Shaw | 24/136 R |

OTHER PUBLICATIONS

Preformed Line Products Fiberlign Dielectric Dead-End Section 2-p. 19.
Standard for All Dielectric Self-Supporting Fiber Optic Cable (ADSS) For Use on Overhead Utility Lines p. 1222 Draft-Nov. 9, 1990.

Primary Examiner—Richard K. Seidel
Assistant Examiner—Hwei-Siu Payer
Attorney, Agent, or Firm—Michael Sand Co.

[57] ABSTRACT

This invention provides an improved cable clamp construction for telecommunication cables such as coaxial cables made from continuous filaments of optical glass fibers which are surrounded by an annulus of aramid material and contained within an outer plastic jacket. In order to provide intermediate gripping action on the continuous cable without its interruption, the gripping action must be carefully controlled and distributed over a relatively sizable intermediate area of the cable to prevent damage to the fragile fibers of the cable over a long useful life in varying climatic conditions. The gripping clamp is comprised of a limited number of components which are capable of surrounding and gripping the cable without undue flexure, the clamp being comprised essentially of a separable sleeve member and a separable plug member, both of which have tapered surfaces to positively secure the cable with compressive forces over a localized area. The complementarily tapered components of the sleeve and plug permit an increased gripping action on the cable without damage thereto for maintaining the cable in permanent tension between a pair of supporting points with an un-tensioned intermediate area of the cable retained between an adjacent pair of supporting points. The separable sleeve and plug members of the clamp firmly grip the cable, in distributed compression greater than the amount of tension.

21 Claims, 5 Drawing Sheets

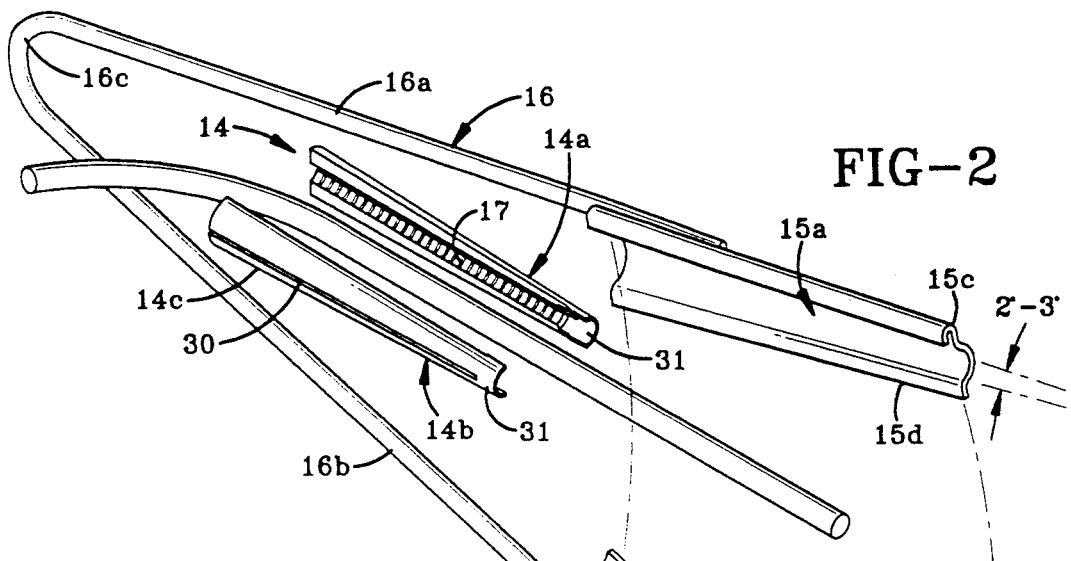
FIG-2
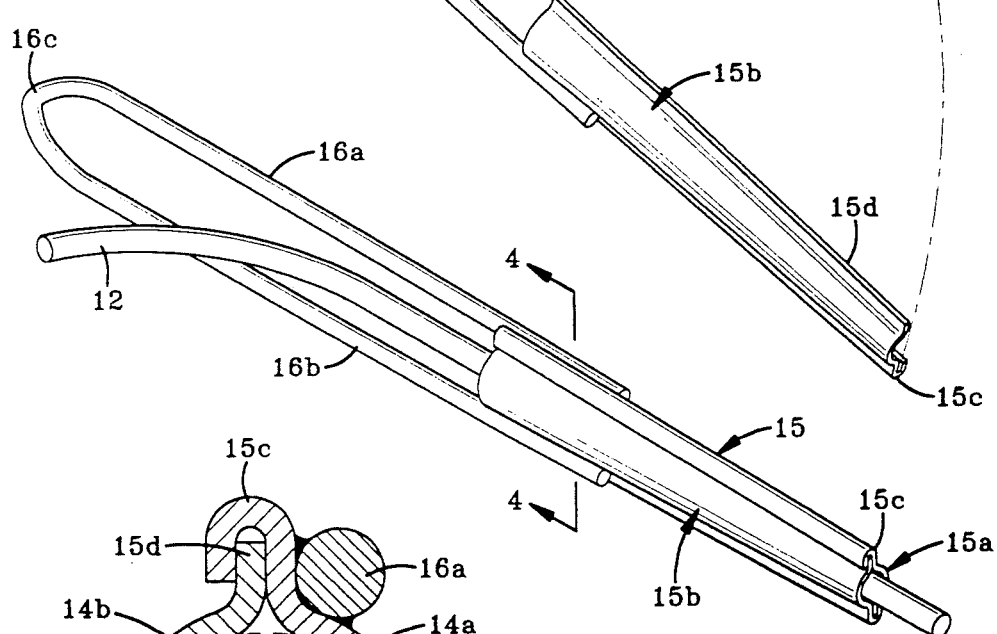
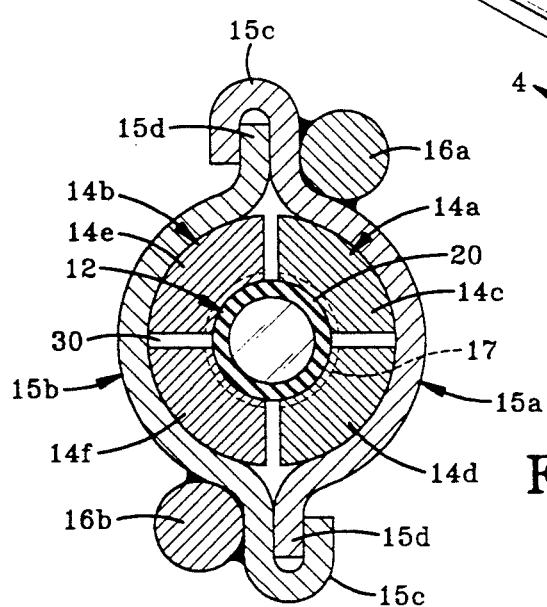
FIG-3
FIG-4

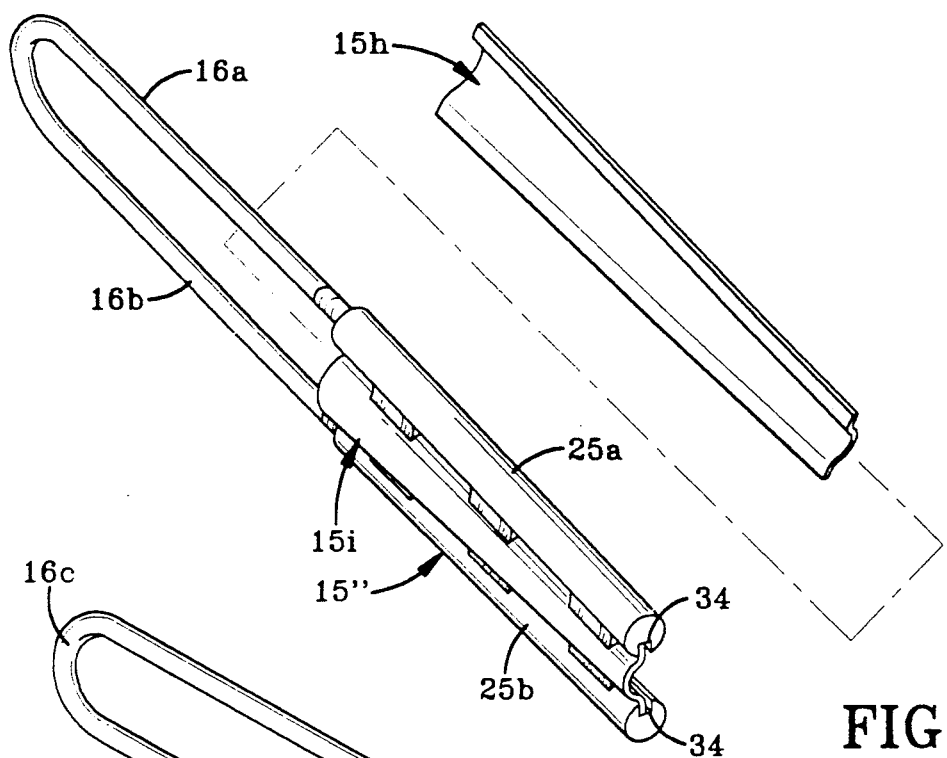
FIG-8
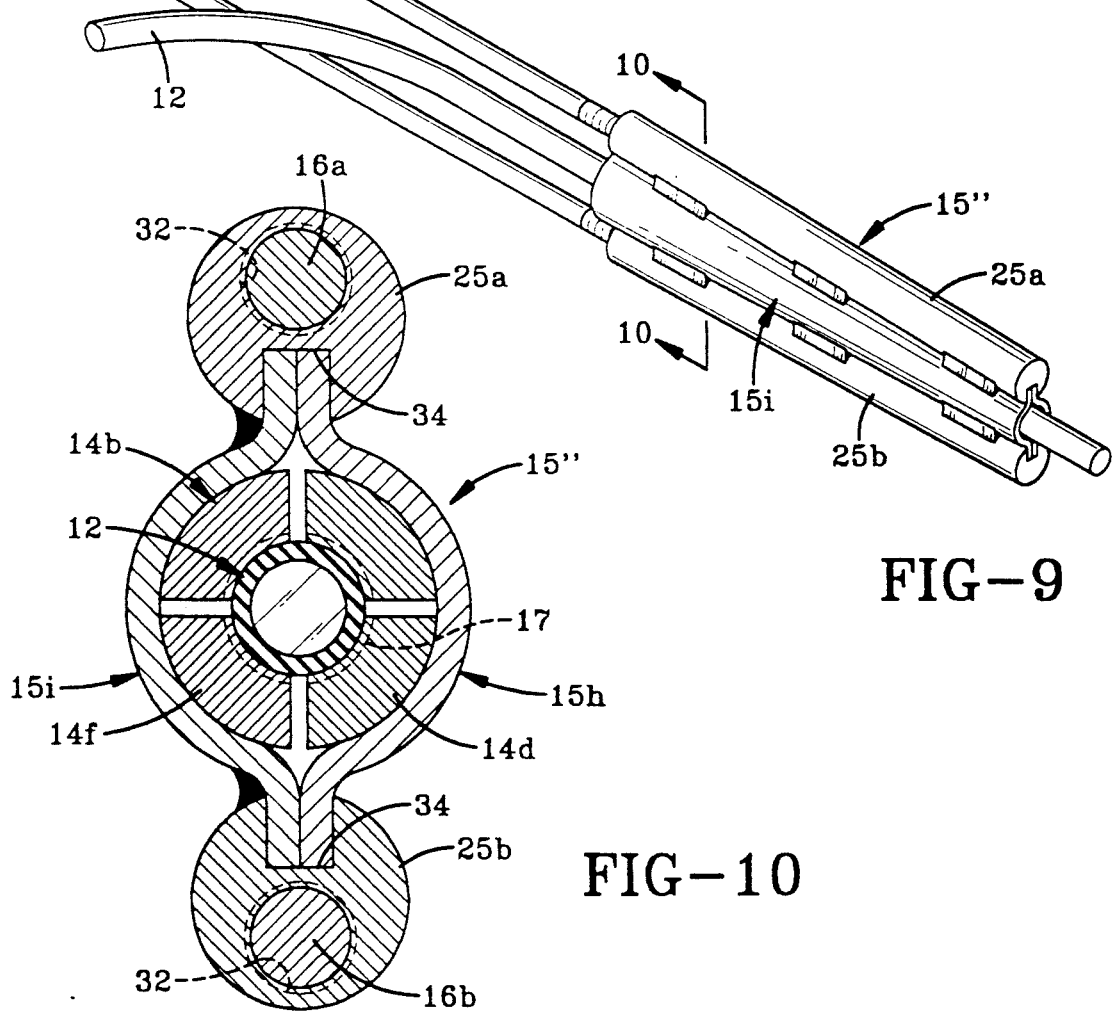
FIG-9
FIG-10

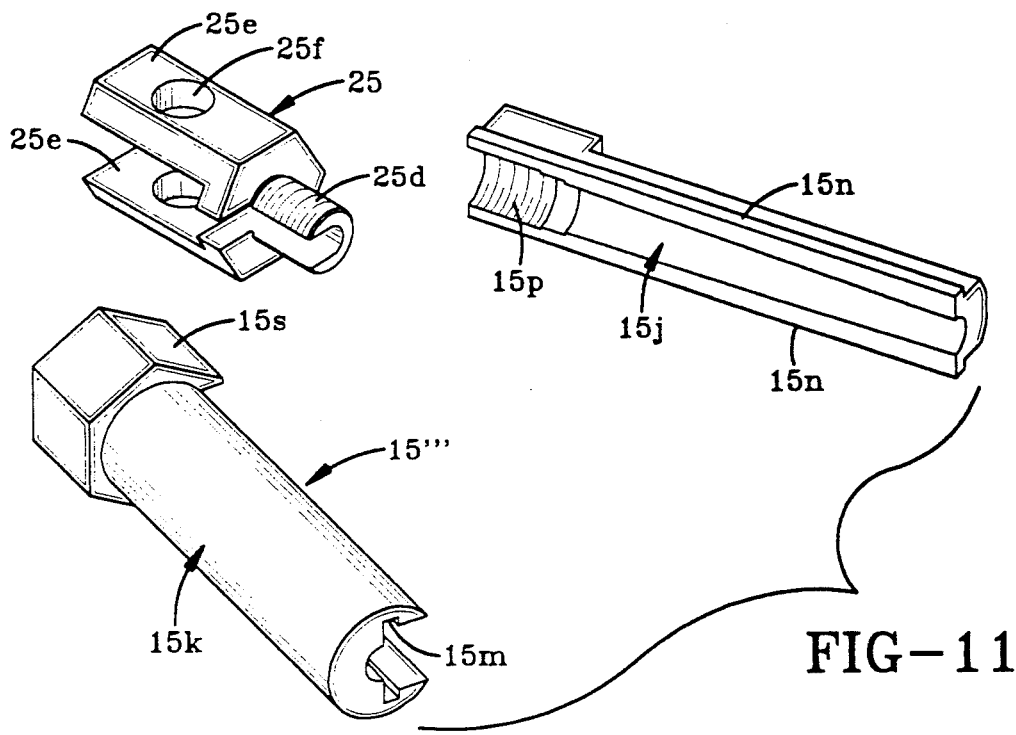
FIG-11
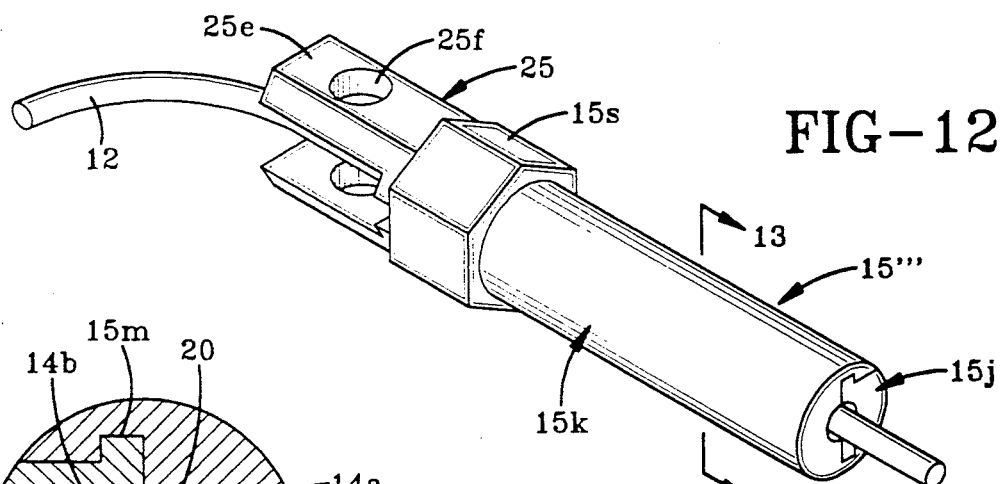
FIG-12
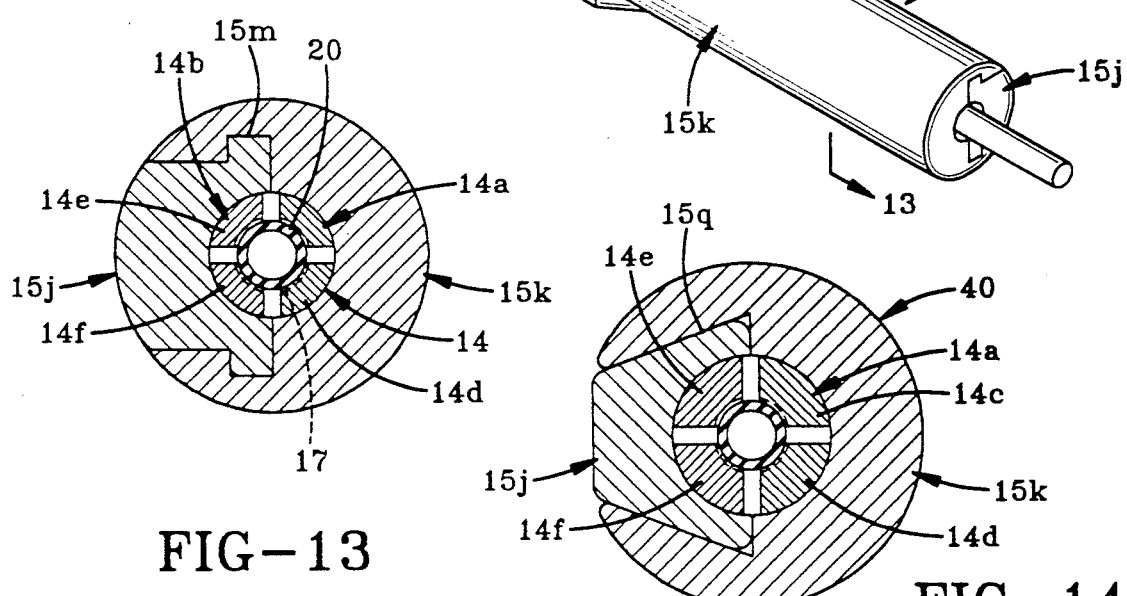
FIG-13
FIG-14

MIDLINE CABLE CLAMP CONSTRUCTION

BACKGROUND OF THE INVENTION

1. Technical Field

The present invention relates to clamps and, more specifically, to midline clamps for supporting lengthy, self-supporting, all dielectric, telecommunication cables at spaced intervals. More particularly, this invention relates to a cable gripping clamp for retaining cables in tension at spaced intervals such as those formed with a multiplicity of continuous fibers, such as glass fiber optics and high modulus synthetic strength member of aramid fibers, having one or more non-metallic plastic sheaths thereover.

2. Background Information

While numerous types of clamps have been used previously in terminating ropes and cables to maintain such flexible continuous lines in tension, modern day telecommunication cables comprised of a substantial number of continuous individual fibers bundled together into a single cable must be supported at intervals without termination. It is highly desirable to support such lengthy cables at spaced intervals without interconnection or termination which junctions are highly labor-intensive in their formation.

Certain types of terminating clamps have heretofore employed a wedging action wherein the greater the amount of tension on the cable, the tighter the clamp will grip the cable. However, such gripping action must be carefully controlled in the use of midline clamping of telecommunication cables to avoid undue compression and abrupt angular bending of such cables to prevent any damage, distortion or breakage of any of the individual fibers during retention of the cable in very severe environmental conditions. Normally, in the use of wedge-type termination clamps, a tapered plug element is mounted on the cable with a complementary sleeve member mounted thereover to support a limited portion of the cable most commonly at its end or near a termination point. Such components are generally cylindrical in shape and may be slipped over the terminating end of the cable in a prescribed order of joinder. The components are fully cylindrical in an uninterrupted annular configuration and cannot be joined to a cable at midpoints where the cable is fully integral and uniformly continuous throughout a great length.

One type of rope clamp construction is disclosed in U.S. Pat. No. 4,509,233, such clamp being utilized at the termination of a rope or cable for supporting the same at a termination or connection point which will not damage or distort the continuous fibers which make up the interior body of such ropes or cables. Such clamp is of particular value in mounting ropes or cables comprised of a plurality of synthetic continuous fibers at a desired terminus; however, in supporting or mounting of modern day telecommunication cables in elevated relation, their terminations are located at substantial distances apart measured in miles requiring the continuous cables to be supported at spaced intervals measured in hundreds to thousands of feet in elevated tensioned relationship between points of delivery and use of conveyed technical information, such as telephone lines and coaxial cables for video pictures, computer data, and the like.

While a number of the prior clamp constructions are capable of satisfactory performance for supporting certain types of heavy-duty cables such as metallic electrical lines for transmission of electrical power, many of such clamps are not capable of supporting highly-sophisticated telecommunication cables which are formed from a multiplicity of very fine individual fibers such as glass fiber optics and aramid fibers which are located within an annulus of aramid material and surrounded by an outer protective plastic jacket. Such cables are formed having very great lengths with substantial numbers of individual fibers packed closely into a cylindrical bundle having one or more plastic layers thereover forming the exterior covering of the cable. The cable is normally extremely flexible having a very high strength-to-weight ratio, but due to its extremely sophisticated fragile nature, only relatively small compressive forces may be applied over limited intermediate areas of the cable which are normally supported in tension. The intermediate area employed to retain the cable is gripped with sufficient compressive force to support the cable in tension even though the particular amount of tension may vary rather widely throughout the operating or useful life of the cable.

Most prior art clamps exert strong compressive forces on the cable over small localized intermediate areas which can cause the individual fibers to be damaged or stressed adversely which will result in breakage or serious disruption of the information carrying capabilities of the fibers. Other prior art clamps exert a very low compressive forces over an extremely long area of cable. The length of the clamp may be as long as 75 times the diameter of the cable. These helical wrapped clamps are extremely unwieldy and difficult to apply to this flexible cable.

There has been a special need for a user friendly midline clamp construction which will provide distributed compressive forces over generally lengthy intermediate areas of the cable to maintain the cable in generally axial relation. Such distributed forces prevent damage to the fragile fibers in a transverse direction and maintain sufficient gripping force on the cable when the tensional forces on the cable are varied through considerable limits. When the cable is mounted outdoors in widely-varying climatic conditions, it must be capable of durably withstanding high winds and accumulations of snow and ice over a long working life with little or no maintenance.

SUMMARY OF THE INVENTION

This invention provides an improved cable clamp construction for self-supporting telecommunication cables made from continuous filaments of optical glass fibers which are located within an annulus of aramid material and surrounded by an outer protective plastic jacket, for example. In order to provide intermediate gripping action on the continuous cable without its interruption, the gripping action must be carefully controlled and distributed over a relatively sizable intermediate area of the cable to prevent damage to the fragile fibers of the cable over a long useful life in varying climatic conditions.

A primary objective of the invention is to provide a gripping clamp comprised of a limited number of components which are capable of surrounding and gripping the cable without undue compression, the clamp being comprised essentially of a separable sleeve member and a separable plug member, both of which have tapered surfaces to positively secure the cable with compressive forces over a localized area. The complementarily tapered components of the sleeve and plug members permit an increased gripping action on the cable without damage thereto for maintaining the cable in permanent tension in elevated relation between a pair of supporting towers or poles, the cable being maintained in tension between such points with an un-tensioned intermediate area of the cable retained between an adjacent pair of supporting points. The separable sleeve and plug members of the clamp are adapted to firmly grip the cable, the clamp being formed with a variety of embodiments depending upon the particular characteristics of the supporting points, none of which involve any termination or severance of the cable due to its lengthy continuous nature.

Another object of the invention is to provide a cable clamp construction in which the internal bore of the outer sleeve and the outer surface of the inner tapered plug have complementarily tapered surfaces to exert a strong gripping action on the cable with compressive forces which are uniformly distributed over the cable to prevent damage thereto. The wedging force which is created by the several tapered components, the plug member being formed with serrations on its cylindrical inner surface, ensure that the gripping force on the cable is always greater than the tension on the cable to prevent the tapered plug from withdrawing or backing off from the surrounding sleeve member which could permit the cable to slip free from the tapered plug and reduce the gripping action to where the supported portion of the cable would be released into an un-tensioned uncontrolled condition.

A still further objective of the invention is to provide a midline gripping clamp in which the separable plug member is formed with a cylindrical bore to uniformly surround the cylindrical cable, the plug having a tapered exterior surface which is complemental to the tapered bore of the surrounding separable sleeve member which together develop strong compressive gripping forces on the cable which are distributed thereover to prevent point loading, the plug member being formed with serrations on its cylindrical inner surface for positive gripping action on the cable.

A still further objective of the invention is to provide a cable clamp construction in which the length of the gripping surface of the tapered plug is at least 10 times greater than the diameter of the cable to be gripped to provide the desired distributed compressive forces over a relatively lengthy portion of the cable to prevent damage to the fragile fibers of the cable. The preferred angle of taper of the complemental plug and sleeve bore preferably ranges from 2° to 3° of taper to ensure that the clamp achieves the optimum gripping characteristics.

A still further objective of the invention is to provide a cable clamp on which the tapered components are separable lengthwise to permit their individually surrounding a localized midline portion of the continuous cable for distributing their compressive forces on the cable when the positive gripping action is obtained. The separated components of the cable when joined and compressed toward each other provide a gripping pressure which increases along a intermediate portion of the cable in uniform relation to prevent point loading which could unduly stress the cable and its fragile fibers, the cable normally having a plastic cylindrical exterior surface which is non-conducting and electrically insulative.

The aforesaid objectives and advantages are obtained by the improved midline cable clamp of this invention, the general nature of which may be described as including an elongated split sleeve having an internal tapered bore; a tapered split plug slidably mounted longitudinally within the tapered bore of the sleeve for gripping a non-metallic exterior cylindrical surface of a cable extending throughout the length of the plug; the sleeve being joined by attachment members joining its severed portions to place the plug in permanent compression on the cable; the sleeve also being connected to a fixed supporting structure to maintain the cable in permanent tension. A single supporting structure may have a pair of such clamps attached therein for supporting the cable in tension in two directions away from the supporting structure with an untension cable portion thereat between the pair of clamps.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 2 is an exploded perspective view of a first embodiment of the midline clamp structure shown in FIG. 1;

FIG. 3 is a perspective view of the clamp structure shown in FIGS. 1 and 2 in assembled position;

FIG. 4 is an enlarged fragmentary sectional view taken on the line 4—4, of FIG. 3;

FIG. 8 is an exploded perspective view of a third embodiment of the midline clamp structure without the cable and interior split plug member being shown;

FIG. 9 is a perspective view of the midline clamp structure of FIG. 8 in assembled position;

FIG. 10 is an enlarged fragmentary vertical sectional view taken on line 10—10, of FIG. 9;

FIG. 11 is an exploded perspective view of a fourth embodiment of the midline clamp structure without the cable and split plug member being shown;

FIG. 12 is a perspective view of the midline clamp structure shown in FIG. 11 in assembled position;

FIG. 13 is an enlarged fragmentary vertical sectional view taken on line 13—13, of FIG. 12; and FIG. 14 is another enlarged fragmentary vertical sectional view similar to FIG. 13, of a further modification of the clamp structure of FIGS. 11 and 12.

Similar numerals refer to similar parts throughout the drawings.

DESCRIPTION OF THE PREFERRED EMBODIMENTS

Figure 1:
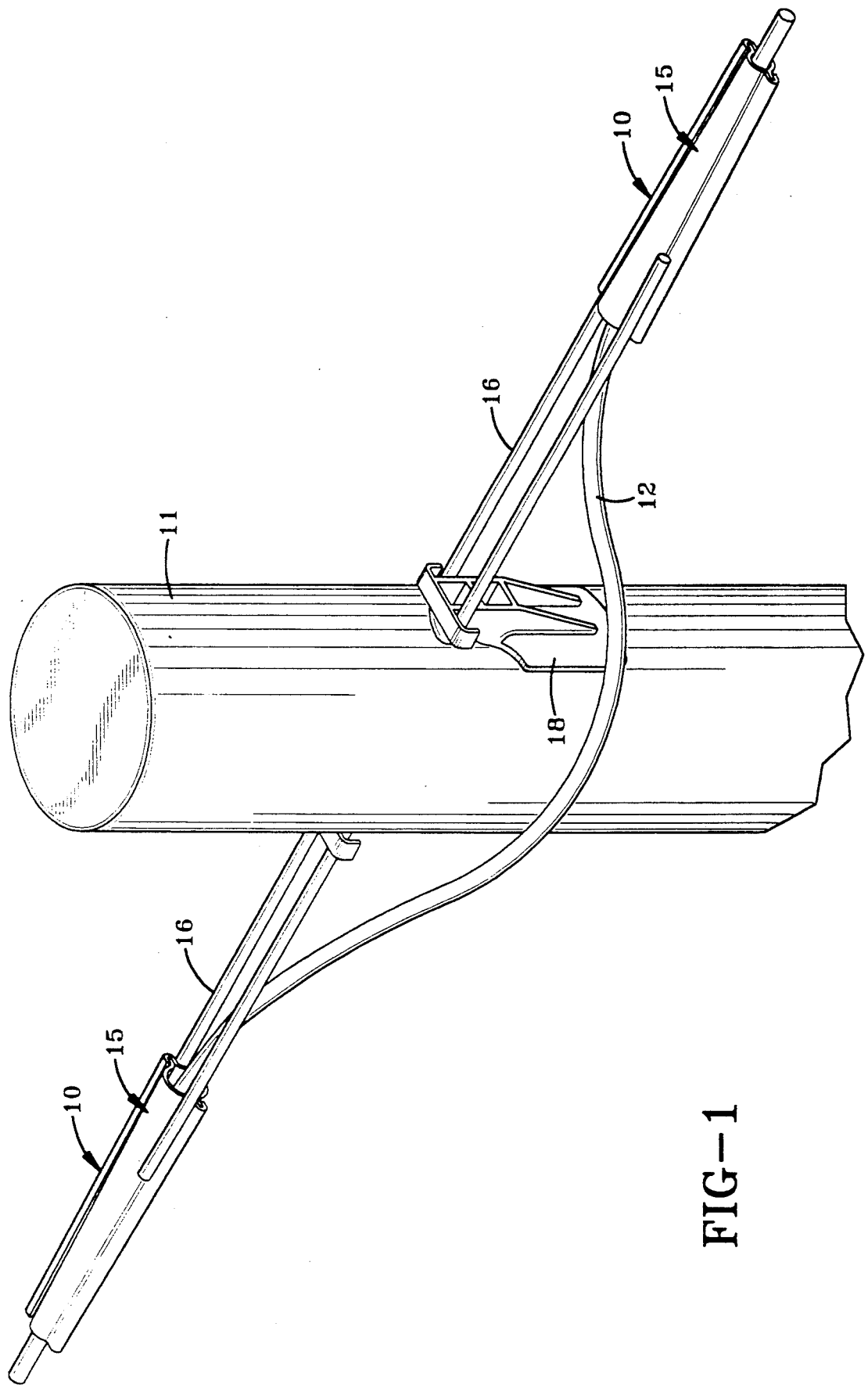
FIG. 1 is a diagrammatic perspective view showing the manner of use of the midline cable clamp structure of the invention.

The improved cable clamp of this invention is shown in a preferred embodiment in FIG. 1 wherein a pair of such clamps 10 is shown. Each of the clamps 10 is attached to a single supporting structure 11 with the continuous cable 12 supported in tension by each of the clamps, the supported portions extending away from the single supporting structure 11. The use of the paired clamps 10 in adjacent relation supporting the continuous cable 12 by the structure 11 is representative of a typical installation of the continuous cable supported by an upright stationary utility pole. This installation illustrates a preferred embodiment of the clamp, although many other types of attachment to an upright pole, tower or building structure may be employed in other applications of the cable clamp structure. In essence, the subject clamp is utilized to support the continuous cable in both tensioned and untensioned relation at the supporting structure 11 which permits expeditious installation of the cable supported at a series of midpoints between terminations or interconnections of the cable from an information generating source to one or more information receiving stations.

For purposes of description, a first embodiment of the cable clamp is shown in FIG. 2 which shows the clamp in exploded relation prior to joinder of its components around an intermediate area of the cable. As shown in FIGS. 1 and 2, clamp 10 includes three main components; a split tapered plug member 14, a split tapered sleeve member 15 and an elongated bail member 16 having a pair of arms 16a and 16b connected to each of the elongated individual semi-circular halves 15a and 15b of the sleeve member 15. The closed semi-circular end 16c of the bail member 16 is attached to a supporting clip member 18 mounted in fixed relation on the supporting structure or utility pole 11 as shown in FIG. 1. The clip member may be bolted to the pole or attached by lag screws depending upon the nature of the pole or other fixed structure.

As shown in FIG. 2, the tapered plug member 14 has a cylindrical interior surface when the two semi-circular halves 14a and 14b are joined with a plurality of serrations 17 therein adapted to grip the cable 12. The exterior surface of the plug 14 has a taper ranging from 2 to 3 degrees of taper. Plug 14 is similar in many features to the plug discussed in U.S. Pat. No. 4,509,233, the contents of which are incorporated herein.

The partible sleeve member 15 has a tapered bore when its individual halves 15a and 15b are joined, the degree of taper being complementary to the exterior tapered surface of the plug member. Each identical stamped sheet metal half of sleeve members 15a and 15b has an elongated semicircular rolled edge 15c on one side and an opposite straight side 15d which permit their being joined by sliding the two halves together transversely in a single plane. The edges are rolled leaving a slot having a width comparable to the sleeve material thickness to obtain a tight interlocking of the sleeve halves. Transverse joinder of the sleeve member is accomplished with the cable 12 therewithin and with the several half sections 14a and 14b of the separable plug 14 spaced away laterally from cable 12.

The half-section segments 14a and 14b of the plug member 14 are joined around the cable 12 at an area beyond the large end of sleeve member 15 as shown in FIG. 2 and the plug member with its halves joined together is then slid telescopically into the interior of the sleeve 15. The plug 14 has a longitudinal dimension which is less than the sleeve 15 to permit its being mounted fully interiorly of the sleeve for tightly gripping the cable located concentrically therewithin. The twin halves 15a and 15b of the sleeve 15 are joined to the arms of the bail member 16 by welding, brazing or the like. Arms 16a and 16b are moved into parallel relation when the sleeve halves are joined into interlocking relation. The closed end 16c of the bail member forms an essentially semi-circular portion which is connected to the fixed supporting structure 11 by the clip member 18 (FIG. 1) capable of retaining the cable in tension.

FIG. 3 shows the sleeve 15 with the intermediate split sleeve segments 15a and 15b around a limited area of the cable. The combined split plug and split sleeve are capable of exerting distributed compressive forces over the cable portion contained within the sleeve. FIG. 4 shows in an enlarged sectional view split sleeve 14 wherein each half-section segments 14a and 14b is comprised of two segments 14c-14d and 14e-14f, respectively. Each of these segments comprise the quadrant of a circle. Each quarter segment is separated by a slit 30 throughout the majority of its length but remain joined by a semi-circular collar segment 31 at one end thereof. These four segments forcefully engage cable 12 when the sleeve is tightly retained by the interlocking edges of the two halves of the sleeve. The arms of the bail member are preferably welded to upper and lower portions respectively of the sleeve segments 15a and 15b as shown in FIG. 4 to permit their transverse interlocking immediately prior to sliding the combined plug 14 along the cable into the interior of the sleeve. The cable is gripped with greater wedging force than any amount of tension to be generated in the cable for its positive retention in long-term durable relation, normally elevated as utility wires.

The plug may be formed with the four equi-angular quadrant configurations shown in FIG. 4 or semi-circular halves each comprising two quadrants, or 180 degrees of the circle as shown in FIG. 2, with sufficient open areas 30 therebetween to permit the plug quadrants to close down against the cable 12 as the compliant soft jacket of the cable reduces in diameter under the compressive forces of the plug. The multiple serrations 17 on the interior surface of the plug 14 assist in generating uniformly distributed forces on the cable essentially devoid of point loading. The tapered outer surfaces of plug member 14 preferably is coated with a friction reducing corrosive resistant material. The plug member is formed of a material such as aluminum, which permits its uniform compression within the sleeve to obtain the desired distributed loading.

The sleeve having the tapered internal bore converges toward the lengthy portion of the cable to be supported in tension between widely-separated supporting locations, the sleeve having a smaller diameter at its converging end less than the exterior diameter at the converging end of the tapered plug to prevent the plug from being pulled beyond the sleeve to ensure that the plug remains in fully supported retained relation within the sleeve. The segments of the sleeve are identical to each other with one rolled edge and one straight edge. When one half is rotated 180 degrees from the other, the straight edge on one fits into the rolled edge of the other permitting their interlocking. The segments of the sleeve are comprised of stamped metal which when joined form a uniform converging bore which is truly circular in cross-section throughout the tapered bore. The cable 12 is shown in FIG. 4 and has a plastic outer sheath 20 with the closely-packed glass coated optical fibers contained within an annulus of aramid material, such as KEVLAR, (not shown) disposed therewithin in a circular configuration. One example of such a cable is referred to as an all dielectric self-supporting fiber optic cable (ADSS).

The cable clamp shown in FIGS. 1-4 is capable of retaining the cable in tension ranging from about 500 lbs. to 10,000 lbs. of tension. The clamp of FIGS. 1-4 is designed for smaller size cables of lower strength, FIG. 5 for easy removal of the cable from the clamp, and the clamp of FIGS. 8-14 for larger cables of higher strength. The cable may have a diameter ranging from about 1/4 inch to 7/8 inches and may be supported at remote locations ranging from about 500 to 2000 feet apart in many typical installations. The tension applied to the cable is capable of increasing in holding power as the several components i.e. plug and sleeve, are drawn together axially as the tension increases due to the cable being subjected to increased and variable tensional forces due to weather conditions or inadvertent loading due to incidents where the cable may be overloaded such as being struck by falling objects.

Figure 5:
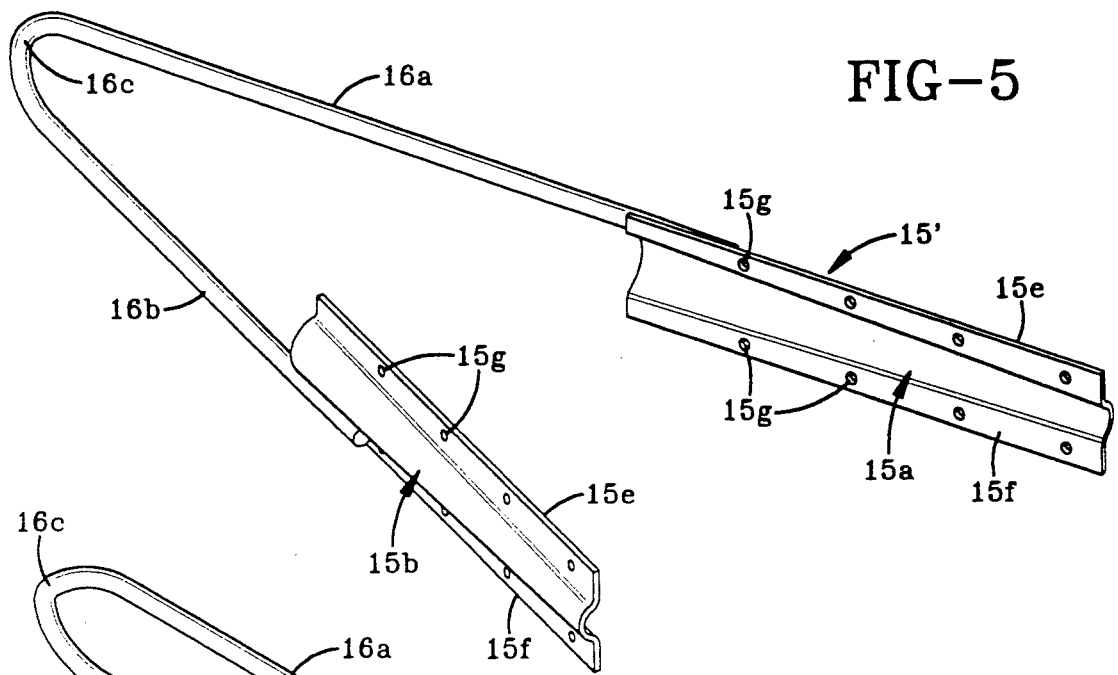
FIG. 5 is a perspective view of a second embodiment of the midline clamp structure without the cable and interior split tapered plug member being shown.

Another embodiment of the invention is shown in FIG. 5 wherein the sleeve member 15' is formed with the converging tapered bore and its two semi-circular segments 15a and 15b each having flattened projecting exterior flanges 15e and 15f extending in a common plane from both edges. The extended flanges 15e and 15f of the several segments have a spaced-apart series of apertures 15g therein which permit joinder of the segments in face-to-face relation by a spaced-apart series of fastening nuts and bolts 21 disposed therein to form the tapered internal circular bore of the sleeve.

Figure 6:
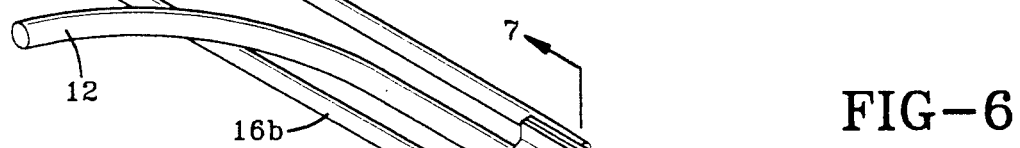
FIG. 6 is a perspective view of the cable structure shown in FIG. 5 in assembled position.

The pair of arms 16a and 16b of the bail member are joined to the larger end of each of the sleeve segments 15c and 15d, such as by welding (FIGS. 5 and 7), so that when the sleeve segments are joined, the arms are disposed in essentially co-planar and parallel relation. FIG. 5 shows the sleeve member segments joined to the arms of the bail without the plug member or cable. As shown in FIG. 6, when the sleeve segments are joined, the separable segments of the split plug member 14 are placed around the cable slightly beyond the larger end of the sleeve 15' and slid telescopically into the sleeve member from its larger toward its smaller end. Similarly, the plug member 14 may be formed from four similarly-shaped segments as aforesaid, each having the configuration of a quadrant of a circle. Again, the plug has a shorter length than the sleeve to permit the plug to be compressed uniformly around the cable essentially over its full length when the sleeve member is fully connected and joined by the fastening bolts to exert compressive forces on the plug.

Figure 7:
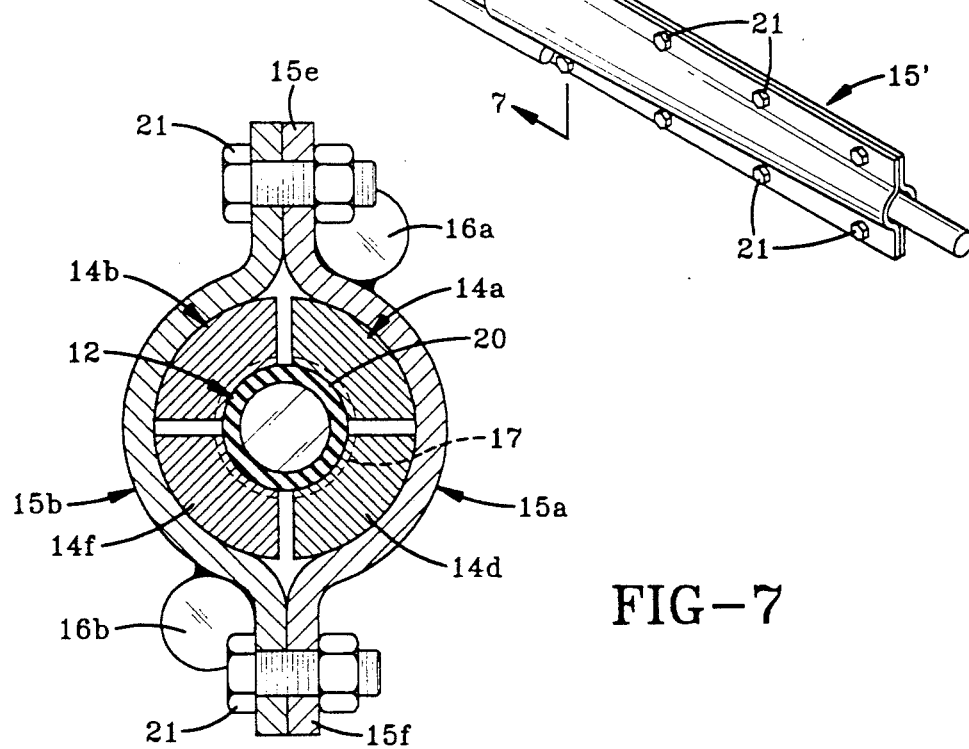
FIG. 7 is an enlarged fragmentary vertical sectional view taken on line 7—7, of FIG. 6.

As shown in FIG. 7, the flattened flanges 15e and 15f of the sleeve are joined face-to-face by the series of nuts and bolts 21 to secure the two halves together and resist the transverse loads resultant to the longitudinal wedging forces from the plug and cable. In the event the clamp must be removed from the cable, the bolts may easily be loosened. Again, the plug member is serrated preferably throughout its interior cylindrical surface 17 as stated previously, which engages the cable exterior to uniformly grip the cable with distributed compressive forces to prevent point loading of the cable. The semi-circular closed end 16c of the bail 16 may be similarly joined to the supporting structure 11 as described hereinabove to place the cable in proper tension with the unsupported portion of the cable being untensioned in the non-supported area between the pair of clamps as shown in FIG. 1.

A third embodiment of the present invention is shown in FIGS. 8-10. The sleeve member 15" is shown in FIG. 8 wherein two semi-circular half segments of the sleeve member 15h and 15i are formed having a tapered internal bore similar to the segmented sleeves shown in the earlier drawings of FIGS. 2 and 5. The elongated semi-circular segments 15h and 15i are formed with flattened flanges extending from their edges in a common plane throughout the length of the sleeve member. The flanges are somewhat comparable to those described in the second embodiment although they are shorter in transverse dimension.

A pair of rods 25a and 25b is joined to one of the semi-circular sleeve segments 15i such as by welding at spaced locations as shown as FIG. 8. Each of the cylindrical rods 25a and 25b have a short cylindrical recess 32 in one end adapted to receive one of the parallel arms 16a and 16b of the bail member for attachment to the supporting structure as stated. Each of the cylindrical bars 25a and 25b have a slot 34 therein adapted to receive the matching flanged edges of the sleeve segments when they are telescopically joined. The semi-circular segment 15h is adapted to be joined to the mating semi-circular segment 15i of the sleeve member beginning at the larger end of the latter for telescopic joinder of the segments by sliding the shortened flanges of the member 15h into juxtaposed relation with similar segment 15i. The slot in each rod is about double the width of the sleeve material and extends throughout the length of rods 25a and 25b. The tapered nature of the sleeve segments allows their matching edges to be joined by the pair of rods 25a and 25b. The recessed ends of the rods 25a and 25b may be joined to the bail arms 16a and 16b by welding, a threaded connection or other means of attachment.

The assembled sleeve 15" is shown in FIG. 9 in combined relation surrounding the intermediate area of the cable 12. The separable split plug member is placed around the cable 12 as aforesaid and telescopically slid into the tapered bore of the sleeve member to surround the same within the intermediate area of the cable. FIG. 10 shows in vertical cross section the four-part segmented plug member 14 within the sleeve 15" in tightened relation around the cable. The segmented plug has an axial dimension less than the axial dimension of the sleeve 15" for firmly gripping the cable at the desired location. The position of the plug within the sleeve and the combined clamp on the cable may be adjusted to exert the proper amount of tension on the cable for attachment of the clamp to the supporting structure. In the event the clamp must be removed from the cable, the separable sleeve member 15h may be slid back towards bail 16 which will release the compressive load on the plugs and permit removal of the plugs, to relocate the clamp on the cable.

A fourth embodiment of the invention is shown in FIGS. 11-14 wherein a sleeve member 15''' is shown having a body 15k with a cylindrical exterior surface and a longitudinal tapered slot 15m therein extending throughout its length. A hexagonal enlarged collar 15s is formed at one end of the sleeve body 15k which is molded or machined integral therewith. A separate tapered generally semicircular segment 15j is formed having a tapered internal bore with tapered flanges 15n formed thereon which segment is adapted to be slid into the longitudinal slot 15m forming the tapered circular internal bore. An internally threaded portion 15p is formed in one end of tapered segment 15j, the threaded portion also being integrally continued within the collar portion 15s of the body member when the sleeve body 15k joined to the segment member 15j as shown in FIG. 12. The cable is contained within the sleeve member 15'''. A tapered plug member 14 similar to that disclosed hereinabove comprised of four quadrant-shaped segments is slid into the sleeve member having the tapered bore such that the internal and external tapers of the sleeve and plug respectively, are joined in face-to-face relation internally of the sleeve. The split plug is applied to the cable beyond the sleeve after joinder of the several components of the sleeve to tightly grip the concentrically aligned cable 12. This configuration is used for applications requiring a clevis end attachment in lieu of the bails end. The clevis slot extends thru one side only of the threaded portion to permit mid line assembly over the cable and into the threaded portion of the two tapered sleeve members.

A clevis member 25 having a threaded portion 25d is screwed into the threaded portion 15p to integrally join the clevis to the combined sleeve member. The clevis 25 has bifurcated arm members 25e, each having a circular aperture 25f therein extending in transverse alignment through the clevis. The clevis may be joined to the combined sleeve member 15 to permit joinder of the clamp to a supporting structure 11 by means of an eye bolt in lieu of the clip member 18 for placing the cable in tension as described hereinabove. The tapered internal bore of the sleeve member 15''' serves to exert distributed compressive forces over the inner tapered plug 14 to firmly grip the cable over a substantial dimension of plug length.

Another variation of sleeve member 15''' is shown in FIG. 14 and indicated generally at 40, wherein the sleeve member is formed having an interiorly-enlarged tapered slot 15q adapted to receive a sleeve segment 15j which is complementarily formed into a dovetailed configuration. The several components of sleeve 40 are thus able to exert considerable compressive force of the interior plug and surrounded cable to firmly grip the same without damage or distortion.

Sleeve members 15''' and 40 preferably are formed of aluminum with the various slots being machined therein to provide an extremely strong clamp for carrying larger loads than the stamped steel sleeve members described above. The clevis member 25 of the sleeve member preferably is joined by an Eye-bolt and pin to the rigid supporting structure 11 to retain the cable in permanent tension.

In each of the various embodiments, the separable plug member remains essentially the same in its exteriorly tapered and interiorly cylindrical configuration. The plug length may vary from about 3 to 8 inches in length with the sleeve members being about 1 to 2 inches longer. The plug bore should preferably be about 10 times or greater longer than the cable diameter to be supported to ensure durable and enduring gripping force. The sleeve configuration is varied in its structure, but in all cases it is capable of exerting compressive forces on the plug and surrounded cable. Such forces are generated by the closely-fitting nature of the sleeve and the matching tapers.

Accordingly, the improved midline cable clamp construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved midline cable clamp construction is constructed and used, the characteristics of the construction, and the advantageous, new and useful results obtained; the new and useful structures, devices, elements, arrangements, parts and combinations, are set forth in the appended claims.

I claim:

1. An improved midline cable clamp construction for supporting a lengthy continuous cable at spaced-apart intervals, said clamp construction comprising:
    (a) an elongated separable tubular sleeve member having at least two longitudinal parts formed with first and second terminating ends and an internal tapered bore when joined converging toward the second terminating end facing the length continuous cable to be supported,
    (b) a separable tapered hollow plus member slidably mounted within the tapered bore of said separable tubular sleeve member for surrounding and gripping a limited intermediate portion of said cable,
    (c) attachment means for securely joining the two longitudinal parts of said separable sleeve member to apply compressive gripping force to said plug member and the limited intermediate portion of said cable, and
    (d) connecting means attached to a separate fixed supporting structure and the first terminating end of said sleeve member for supporting a substantial length of said cable in durable permanently-retained relation.

2. The cable clamp construction in accordance with claim 1, wherein the said separable tapered hollow plug member is formed with a plurality of serrations on its interior surface for forcefully gripping the limited intermediate portion of said cable.

3. The cable clamp construction in accordance with claim 1, wherein the outer surface of said plug member and the inner surface of said sleeve member have complemental tapered surfaces ranging from about 2 to 3 degrees of taper.

4. The cable clamp construction in accordance with claim 1, wherein the said longitudinal parts are two semi-circular halves in cross section having exterior surfaces which are securely joined by said attachment means to grippingly surround said tapered plug member and the limited intermediate portion of said cable therebeneath.

5. A cable clamp construction in accordance with claim 1, wherein the said separable plug member is tubular having serrated cylindrical interior surfaces and having at least two similar segments having tapered exterior surfaces complemental to the interior surfaces of said separable sleeve member.

6. A cable clamp construction in accordance with claim 1, wherein the said hollow plug member is tubular and comprised of four similarly tapered segments, each generally equal in cross-section to a quadrant of a circle.

7. A cable clamp construction in accordance with claim 1, wherein said connecting means comprises an elongated bail member having a pair of arms connected to said separate fixed supporting structure and said separable sleeve member for grippingly supporting a substantial lengthy portion of said cable in tension.

8. A cable clamp construction in accordance with claim 1, wherein said connecting means comprises a clevis member.

9. A cable clamp construction in accordance with claim 1, wherein said attachment means for joining exterior surface portions of said separable sleeve member comprises integral interlocking tongue and groove elements formed on longitudinal exterior edges of said longitudinal parts.

10. A cable clamp construction in accordance with claim 1, wherein said separable tapered hollow plug member has a shorter overall length than said separable sleeve member.

11. A cable clamp construction in accordance with claim 1, wherein said longitudinal parts are two similar semi-circular halves having juxtaposed flattened longitudinal edges for joinder by said attachment means which comprises nut and bolt fastening members.

12. A cable clamp construction in accordance with claim 1, wherein the said longitudinal parts of said separable tubular sleeve member are formed having tongue and groove interlocking configurations for their telescopic joinder.

13. A cable clamp construction in accordance with claim 1, wherein said attachment means comprises a cylindrical exterior surface and a hollow recess extending generally throughout its length formed on one of said longitudinal parts adapted to receive a complemental locking member formed on the other of said longitudinal parts in a generally tongue and groove arrangement.

14. A cable clamp construction in accordance with claim 13, wherein said separable tubular sleeve member has a cylindrical exterior surface and an enlarged annular collar affixed to its first terminating end; and in which the connecting means is a clevis member.

15. A cable clamp construction in accordance with claim 1, wherein said connecting means comprises an elongated bail member having a generally parallel pair of arms joining said fixed supporting structure and the first terminating end of said sleeve member.

16. An improved midline cable clamp construction for supporting at spaced-apart intervals a lengthy continuous cable having a non-metallic plastic exterior surface, said clamp construction comprising:
(a) an elongated separable tubular sleeve ember having at least two transversely-separable parts formed with first and second terminating ends and an internal tapered bore when joined converging toward the second terminating end facing the length continuous cable to be supported,
(b) a separable tapered hollow plug member having at lest two transversely-separable parts slidably mounted on said cable and within the tapered bore of said separable tubular sleeve member for surrounding and gripping a limited intermediate portion of said cable,
(c) attachment means for longitudinally joining the two transversely-separable parts of said separable tubular sleeve member to apply compressive gripping force to said plug member and the underlying limited intermediate portion of said cable,
(d) a separate fixed supporting structure capable of supporting a lengthy substantial portion of said cable, and
(e) connecting means attached to said separate fixed supporting structure and the first terminating end of said sleeve member for supporting said lengthy substantial portion of said cable in tensioned elevated arrangement.

17. An improved midline cable clamp construction for supporting a lengthy continuous cable at spaced-apart intervals, said clamp construction comprising:
a) an elongated separable tubular sleeve member having at least two longitudinal parts which are semi-circular halves in cross section, formed with first and second terminating ends and an internal tapered bore when joined converging toward the second terminating end facing the lengthy continuous cable to be supported;
b) a separable tapered hollow plug member slidably mounted within the tapered bore of said separable tubular sleeve member for surrounding and gripping a limited intermediate portion of said cable;
c) attachment means for securely joining the two semi-circular halves to grippingly surround said tapered plug member and apply a compressive gripping force to said plug member and the limited intermediate portion of said cable; and
d) connecting means attached to a separate fixed supporting structure and the first terminating end of said sleeve member for supporting a substantial length of said cable in durable permanently-retained relation.

18. An improved midline cable clamp construction for supporting a lengthy continuous cable at spaced-apart intervals, said clamp construction comprising:
a) an elongated separable tubular sleeve member having at least two longitudinal parts formed with first and second terminating ends and an internal tapered bore when joined converging toward the second terminating end facing the lengthy continuous cable to be supported;
b) a separable tapered hollow plug member slidably mounted within the tapered bore of said separable tubular sleeve member for surrounding and gripping a limited intermediate portion of said cable;
c) attachment means for joining exterior surface portions of said separable sleeve member to apply compressive gripping force to said plug member and the limited intermediate portion of said cable, said attachment means comprising integral interlocking tongue and groove elements formed on longitudinal exterior edges of said longitudinal parts; and
d) connecting means attached to a separate fixed supporting structure and the first terminating end of said sleeve member for supporting a substantial length of said cable in durable permanently-retained relation.

19. An improved midline cable clamp construction for supporting a lengthy continuous cable at spaced-apart intervals, said clamp construction comprising:
a) an elongated separable tubular sleeve member having at least two longitudinal parts which are similar semi-circular halves with juxtaposed flattened longitudinal edges, said sleeve member being formed with first and second terminating ends and an internal tapered bore when joined converging toward the second terminating end facing the lengthy continuous cable to be supported;

b) a separable tapered hollow plug member slidably mounted within the tapered bore of said separable tubular sleeve member for surrounding and gripping a limited intermediate portion of said cable;

c) attachment means including nut and bolt fastening members for joining the flattened longitudinal edges of the semi-circular halves of said separable sleeve member to apply compressive gripping force to said plug member and the limited intermediate portion of said cable; and d) connecting means attached to a separate fixed supporting structure and the first terminating end of said sleeve member for supporting a substantial length of said cable in durable permanently-retained relation.

20. An improved midline cable clamp construction for supporting a lengthy continuous cable at spaced-apart intervals, said clamp construction comprising:

a) an elongated separable tubular sleeve member having at lest two longitudinal parts formed with first and second terminating ends and an internal tapered bore when joined converging toward the second terminating end facing the lengthy continuous cable to be supported;

b) a separable tapered hollow plug member slidably mounted within the tapered bore of said separable tubular sleeve member for surrounding and gripping a limited intermediate portion of said cable;

c) attachment means for joining exterior surface portions of said separable sleeve member to apply compressive gripping force to said plug member and the limited intermediate portion of said cable wherein said longitudinal parts of said separable tubular sleeve member are formed with tongue and groove interlocking configurations for their telescopic joinder; and d) connecting means attached to a separate fixed supporting structure and the first terminating end of said sleeve member for supporting a substantial length of said cable in durable permanently-retained relation.

21. An improved midline cable clamp construction for supporting a lengthy continuous cable at spaced-apart intervals, said clamp construction comprising:

a) an elongated separable tubular sleeve member having at least two longitudinal parts formed with first and second terminating ends and an internal tapered bore when joined converging toward the second terminating end facing the lengthy continuous cable to be supported;

b) a separable tapered hollow plug member slidably mounted within the tapered bore of said separable tubular sleeve member for surrounding and gripping a limited intermediate portion of said cable;

c) attachment means for joining the two longitudinal parts of said separable sleeve member to apply compressive gripping force to said plug member and the limited intermediate portion of said cable wherein said attachment means comprises a cylindrical exterior surface and a hollow recess extending generally throughout its length formed on one of said longitudinal parts adapted to receive a complemental locking member formed on the other of said longitudinal parts in a generally tongue and groove arrangement; and d) connecting means attached to a separate fixed supporting structure and the first terminating end of said sleeve member for supporting a substantial length of said cable in durable permanently-retained relation.

* * * * *